(12) United States Patent
Albrecht, Jr. et al.

(10) Patent No.: US 6,652,226 B2
(45) Date of Patent: Nov. 25, 2003

(54) METHODS AND APPARATUS FOR REDUCING SEAL TEETH WEAR

(75) Inventors: Richard William Albrecht, Jr., Fairfield, OH (US); Joseph Charles Kulesa, West Chester, OH (US); Robert Paul Czachor, Cincinnati, OH (US); Shesh Krishna Srivatsa, Cincinnati, OH (US); Daniel Edward Wines, Cincinnati, OH (US); Thomas Tracy Wallace, Maineville, OH (US)

(73) Assignee: General Electric Co., Schenectady, NY (US)

( * ) Notice: Subject to any disclaimer, the term of this patent is extended or adjusted under 35 U.S.C. 154(b) by 9 days.

(21) Appl. No.: 09/783,277

(22) Filed: Feb. 9, 2001

(65) Prior Publication Data

US 2002/0110451 A1 Aug. 15, 2002

(51) Int. Cl.$^7$ ................................. F01D 11/12
(52) U.S. Cl. .................... 415/173.4; 415/173.5; 415/174.4; 415/174.5
(58) Field of Search ................ 415/173.4, 173.5, 415/173.6, 174.5, 230; 277/412, 414, 415, 939, 941, 942

(56) References Cited

U.S. PATENT DOCUMENTS

| | | | | |
|---|---|---|---|---|
| 2,963,307 A | * | 12/1960 | Bobo | 277/414 |
| 3,042,365 A | * | 7/1962 | Curtis et al. | 415/173.4 |
| 3,053,694 A | * | 9/1962 | Daunt et al. | 427/230 |
| 3,547,455 A | * | 12/1970 | Daunt | 277/96 |
| 4,022,481 A | * | 5/1977 | Long et al. | 277/96.1 |
| 4,087,199 A | | 5/1978 | Hemsworth et al. | |
| 4,198,839 A | | 4/1980 | Linko, III et al. | |
| 4,289,447 A | | 9/1981 | Sterman et al. | |
| 4,460,185 A | | 7/1984 | Grandey | |
| 4,618,152 A | * | 10/1986 | Campbell | 277/53 |
| 4,767,267 A | | 8/1988 | Salt et al. | |
| 4,867,639 A | * | 9/1989 | Strangman | 415/173.4 |
| 5,029,876 A | | 7/1991 | Orlando et al. | |
| 5,096,376 A | * | 3/1992 | Mason et al. | 415/173.5 |
| 5,218,816 A | * | 6/1993 | Plemmons et al. | 60/39.75 |
| 5,388,959 A | | 2/1995 | Forrester et al. | |
| 6,251,494 B1 | * | 6/2001 | Schreiber | 428/116 |
| 6,290,455 B1 | | 9/2001 | Hemmelgarn et al. | |

* cited by examiner

*Primary Examiner*—Ninh H. Nguyen
(74) *Attorney, Agent, or Firm*—Nathan D. Herkamp; Armstrong Teasdale LLP; Robert B. Reeser, III

(57) ABSTRACT

A gas turbine engine includes a non-rotatable member that includes a honeycomb seal that reduces wear to rotor seal teeth disposed within the gas turbine engine. The gas turbine engine also includes a rotatable annular member including a sealing assembly disposed between rotor and stator components. The rotatable annular member includes seal teeth that extend radially outward from the rotatable annular member. The stator components include a non-rotatable member that includes a honeycomb seal that extends radially inward. The honeycomb seal is fabricated from a material that has a melting temperature less than approximately 2000° F.

18 Claims, 4 Drawing Sheets

METHODS AND APPARATUS FOR REDUCING SEAL TEETH WEAR

BACKGROUND OF THE INVENTION

This invention relates generally to gas turbine engines and, more particularly, to honeycomb seals included in gas turbine engines.

Honeycomb seals are widely used in aircraft, marine and industrial power turbine engines. For example, a gas turbine engine typically includes at least one row of rotor blades and a plurality of honeycomb seals within cavities formed in a rotor assembly. Typically, honeycomb materials having a melting temperature over 2100° F., e.g., Hastelloy X, are brazed onto backing plates. During break-in engine operations, seal teeth located on a first rotatable annular member cut grooves or channels into the honeycomb seals located on either a second non-rotatable member or a second rotatable member having a different rotation speed than that of the first rotatable member. The channels cut by the first rotatable annular member with seal teeth define an operating clearance between the seal teeth and the honeycomb material, and permit the honeycomb material to seal against the seal teeth to restrict air from flowing between the cavities formed by the seal teeth and honeycomb material.

During break-in and normal engine operating conditions, the seal teeth cut into the honeycomb material with low incursion rates. High or rapid incursion rates may develop, for example, as a result of tight tolerances. Additional high incursion rates may occur after maintenance is performed to existing turbines and after turbine module components are interchanged or replaced. During operating periods of high incursion rates, frictional heat generated between the seal teeth and honeycomb material increases from a normal operating temperature to a value below that of the melting temperature of the honeycomb material. As a result of the increased temperature, the seal teeth do not effectively cut into the honeycomb material, but rather the honeycomb cells yield and "smear" when contacted with the seal teeth. Because the seal teeth do not effectively cut the honeycomb material, a high seal rubbing torque develops and the frictional heat generated between the seal teeth and the honeycomb material is further increased.

The increased temperature induced within the seal teeth causes potential material degradation, possible fatigue cracking and possible quench cracking of the seal teeth. Over time, continued exposure to high temperatures may result in the seal teeth exceeding a yield stress, thus resulting in residual stresses that may reduce fatigue life and degradation of the seal teeth. Furthermore, if the honeycomb material is not positioned a uniform distance from the rotating member blades circumferentially around the turbine, local rubbing may occur. The combination of the local rubbing and the increased temperature of the seal teeth may produce sinusoidal thermal gradients and deeper rubs into the honeycomb material. Furthermore, as a result of the deeper rubs, operating clearances are increased locally, and air may flow between the rotating member and honeycomb material, decreasing an effectiveness of the seal.

BRIEF SUMMARY OF THE INVENTION

In an exemplary embodiment, a gas turbine engine includes a non-rotating assembly including a honeycomb seal that reduces wear to seal teeth disposed within the gas turbine engine. The gas turbine engine non-rotating assembly includes a sealing assembly disposed between rotor components and stator components. The rotor components include a rotatable annular member including seal teeth extending radially outward from the rotatable annular member. The stator components include a non-rotatable member including a honeycomb seal that extends radially inward. The honeycomb seal is fabricated from a material that has a melting temperature less than approximately 2000° F.

During engine operations, the rotating seal teeth contact the honeycomb material and generate a temperature that is not greater than the melting temperature of the honeycomb material. Accordingly, as the seal teeth contact the honeycomb material, grooves or channels are cut easily into the honeycomb by the seal teeth. The channels define an operating clearance between the blade seal teeth and the honeycomb material, and permit the honeycomb material to seal against the seal teeth to restrict air from flowing between the seal teeth and honeycomb material. Because the melting temperature of the honeycomb seal is less than 2000°F., a temperature increase generated when the rotating seal teeth cut into the honeycomb seal is limited to a temperature less than the melting temperature of the honeycomb material. Furthermore, because the melting temperature of the honeycomb material is less than 2000° F., the temperature increase induced within the seal teeth is reduced in comparison to temperature increases induced in seal teeth cutting through known honeycomb seals fabricated from materials with higher melting temperatures. As a result, property degradation to the seal teeth and cracking due to thermal stresses are reduced.

DETAILED DESCRIPTION OF THE INVENTION

Figure 1:
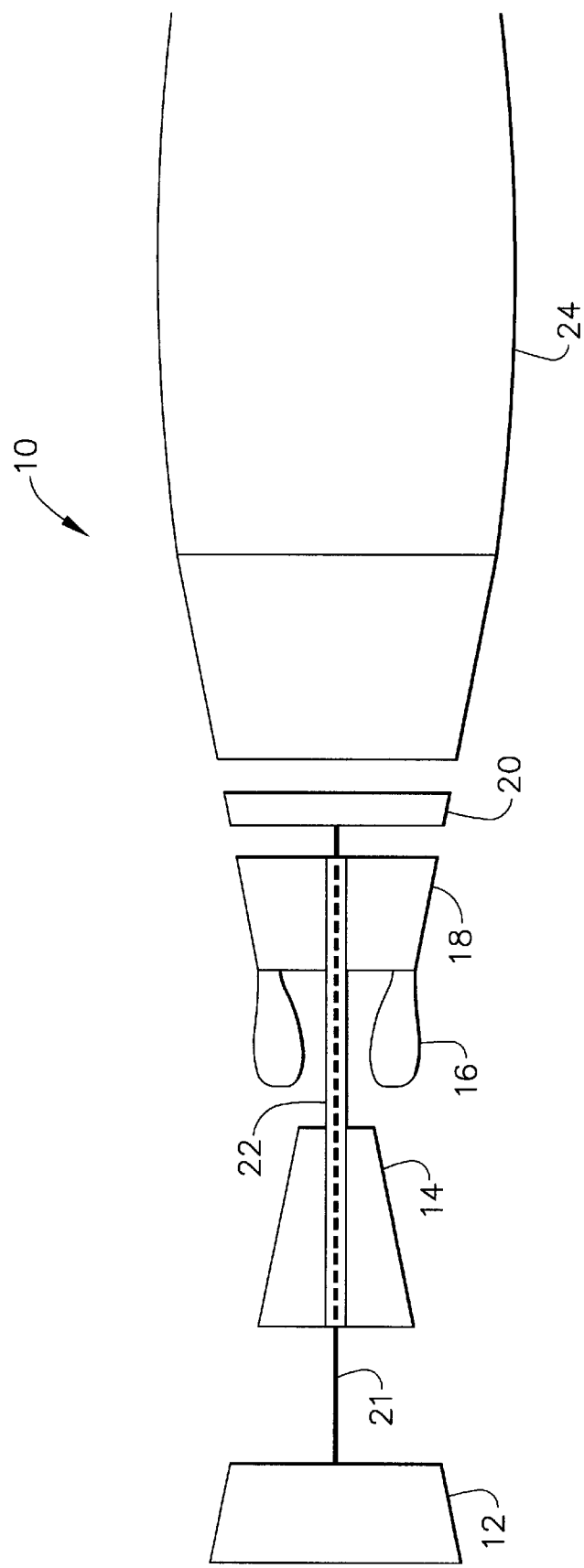
FIG. 1 is a schematic illustration of a gas turbine engine.

FIG. 1 is a schematic illustration of a gas turbine engine 10 including a low pressure compressor 12, a high pressure compressor 14, and a combustor 16. In one embodiment, engine 10 includes a high pressure turbine 18 and a low pressure turbine 20. Compressor 12 and turbine 20 are coupled by a first shaft 21, and compressor 14 and turbine 18 are coupled by a second shaft 22.

In operation, air flows through low pressure compressor 12 and compressed air is supplied from low pressure compressor 12 to high pressure compressor 14. The highly compressed air is delivered to combustor 16. Airflow from combustor 16 drives rotating turbines 18 and 20 and exits gas turbine engine 10 through a nozzle 24.

Figure 2:
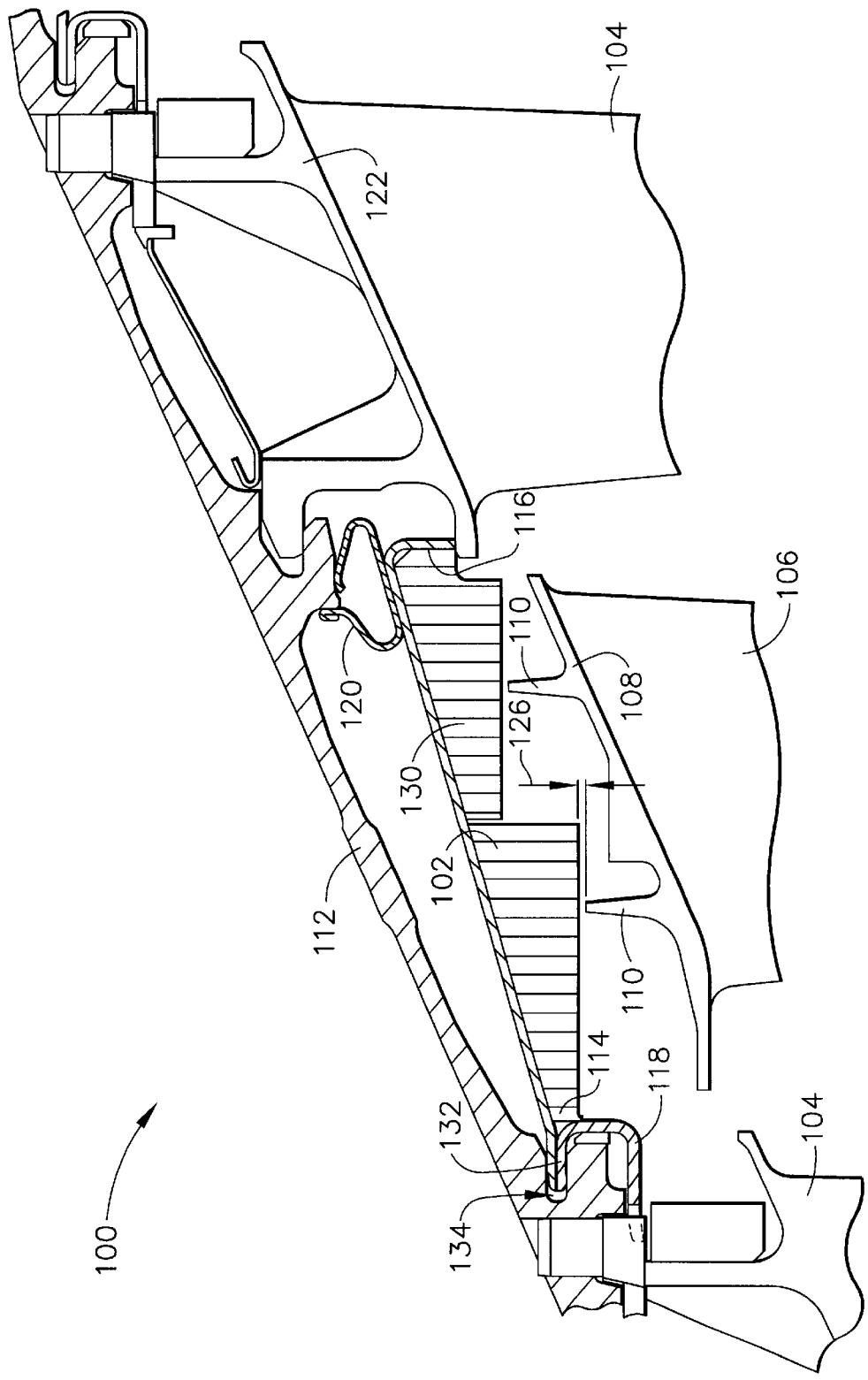
FIG. 2 is a partial schematic view of a low pressure turbine that may be used with the gas turbine engine shown in FIG. 1.

FIG. 2 is a partial schematic view of a rotor assembly 100 that may be used with a gas turbine engine, such as gas turbine engine 10 (shown in FIG. 1). In an exemplary embodiment, rotor assembly 100 includes a honeycomb seal 102, a plurality of stator vanes 104, and at least one rotating member. Rotating member 106 includes a tip 108 having at least one seal tooth 110 extending outward therefrom towards a casing 112. Casing 112 is disposed radially outward from stator vanes 104 and rotating member 106.

Honeycomb seal 102 extends circumferentially around rotating member 106 and includes a first end 114 and a second end 116 attached to casing 112. Honeycomb seal first end 114 is attached to casing 112 with a first connector 118 and honeycomb seal second end 116 is attached to casing 112 with a second connector 120. Second connector 120 provides a spring force to second end 116 of honeycomb seal 102 to push honeycomb seal 102 into contact with a stator vane platform 122 such that when engine 100 is inoperative, seal teeth 110 are a distance 126 from honeycomb seal 102. In one embodiment, honeycomb seal 102 contains material 130, described in more detail below, and is assembled into casing 112 at first end 114 such that an axial projection 132 is received within an axial groove 134 in casing 112.

During initial engine operation, as shown in FIG. 2, seal teeth 110 are a distance 126 from honeycomb seal 102. As an operating speed of engine 100 is increased, seal teeth 110 expand radially outward and contact or rub honeycomb seal 102 and cut grooves (not shown) into honeycomb seal 102 to define an operating clearance (not shown) between seal teeth 110 and honeycomb seal 102. More specifically, during operation, seal teeth 110 rotate via a rotor (not shown) with respect to casing 112, and stator vanes 104 remain stationary with respect to casing 112. Air flows from an upstream side 138 of turbine 100 to a downstream side 140 of turbine 100. After turbine 100 operates and reaches a sufficient operating temperature, seal teeth 110 extend into honeycomb seal 102 and restrict air from flowing between seal teeth 110 and honeycomb seal 102.

Figure 3:
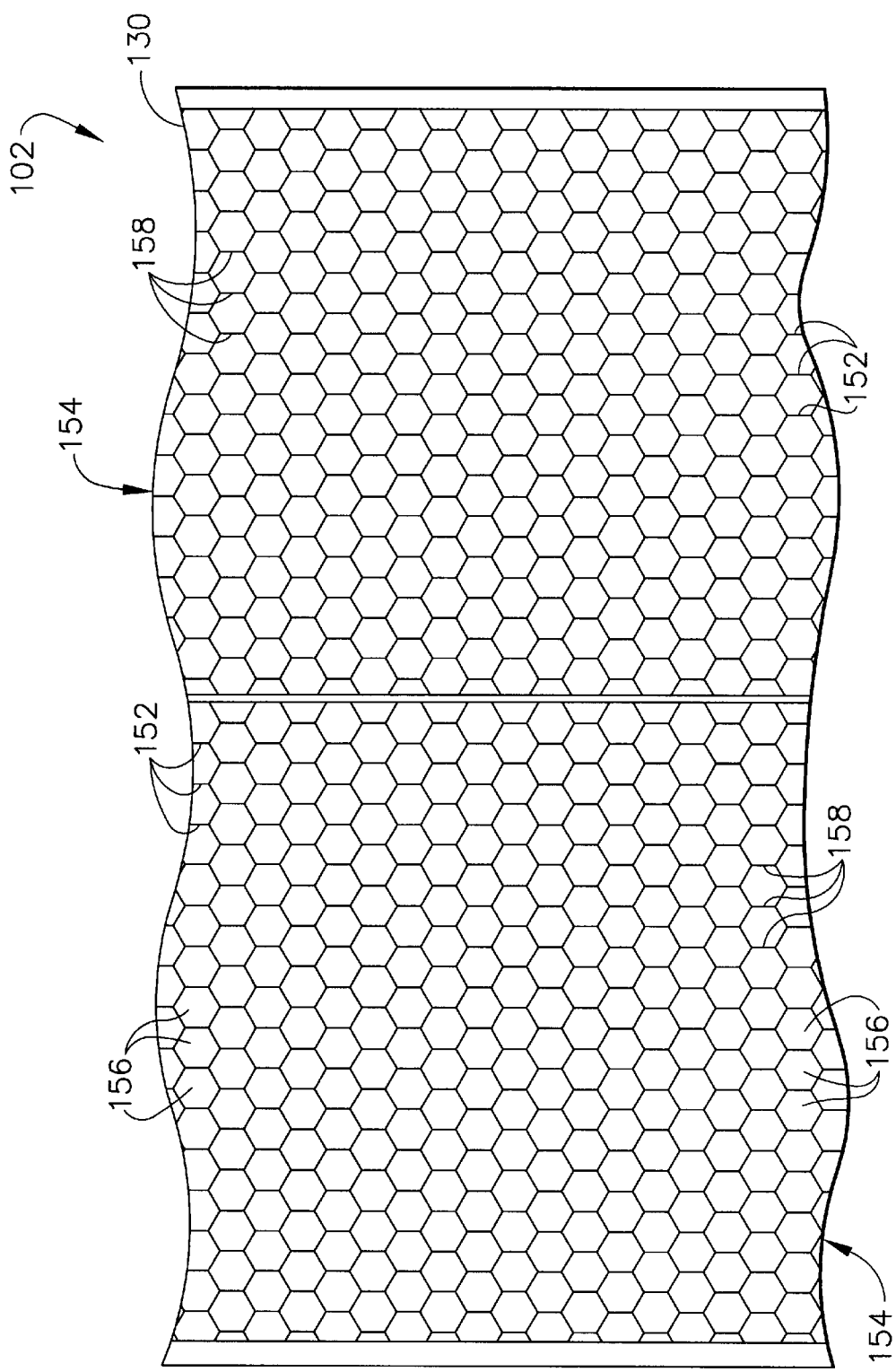
FIG. 3 is an enlarged end view of a honeycomb seal assembly used with the low pressure turbine assembly shown in FIG. 2.

FIG. 3 is an enlarged end view of honeycomb seal 102. Honeycomb seal 102 is fabricated from material 130 formed of a plurality of thin corrugated strips 152 mated together in a honeycomb configuration 154. Honeycomb configuration 154 includes a plurality of cells 156 and a plurality of cell walls 158 separating each cell 156. In one embodiment, cells 156 have a hexagon shape. Alternatively, cells 156 could have a circular, triangular, rectangular, pentagon, or other shape.

Material 130 has intrinsic properties that permit honeycomb seal 102 to withstand harsh environmental conditions prevalent during engine operations. In particular, material 130 can withstand exposure to a high range of temperatures and pressures, and has a melting temperature below approximately 2000° F. In one embodiment, material 130 is composed of an alloy material possessing a melting temperature of approximately 1930° F. In another embodiment, honeycomb material 130 is brass and has a melting temperature of approximately 1650° F. In a further embodiment, honeycomb material 130 is aluminum and has a melting temperature of approximately 1050° F. Alternatively, material 130 is any other suitable material or composite material that is environmentally resistive and has a melting temperature less than 2000° F.

During gas turbine engine operation, an operating temperature of seal teeth 110 increases during rubbing with honeycomb seal 102 to a temperature that is not greater than the melting temperature of honeycomb seal material 130. Because the melting temperature of honeycomb seal 102 is less than 2000° F., a temperature increase induced within seal teeth 110 is limited to less than approximately 2000° F. and is reduced during rubbing between seal teeth 110 and honeycomb seal 102. Furthermore, because the seal teeth cutter temperature increase is reduced, an impact to seal teeth cutter properties of rubbing honeycomb seal 102 is reduced. Specifically, because heat damage to seal teeth 110 is reduced seal teeth durability is improved. Additionally, property degradation to seal teeth 110 and cracking due to thermal stresses are reduced.

Lowering the potential temperature increase of seal teeth 110 during rubbing also reduces residual stresses induced within seal teeth 110 that develop when yield stresses for seal teeth 110 are exceeded. In addition, the reduced temperature increase results in less torque being produced between seal teeth 110 and honeycomb seal 102, thus, causing less wear of seal teeth 110. Furthermore, the reduced temperature increase facilitates reducing crack initiation within honeycomb seal 102 and fatigue degradation of honeycomb seal 102.

If a honeycomb seal 102 is installed within a gas turbine engine 100 (shown in FIG. 1) such that distance 126 (shown in FIG. 2) is not circumferentially uniform around gas turbine engine 100, during operation of engine 100, local rubbing between seal teeth 110 and honeycomb seal 102 may occur. Heat generated between seal teeth 110 and honeycomb 102 during occurrences of local rubbing sinusoidal thermal gradients may be induced within seal teeth 110. Over time, if such sinusoidal thermal gradients are severe, wider operating clearances may develop. The severity of such sinusoidal thermal gradients is proportional to an amount of heat input into seal teeth 102. Accordingly, because the potential temperature increase of seal teeth 110 is reduced, the severity of any sinusoidal thermal gradients generated is reduced and operating clearances between seal teeth 110 and honeycomb seal 102 are improved.

Figure 4:
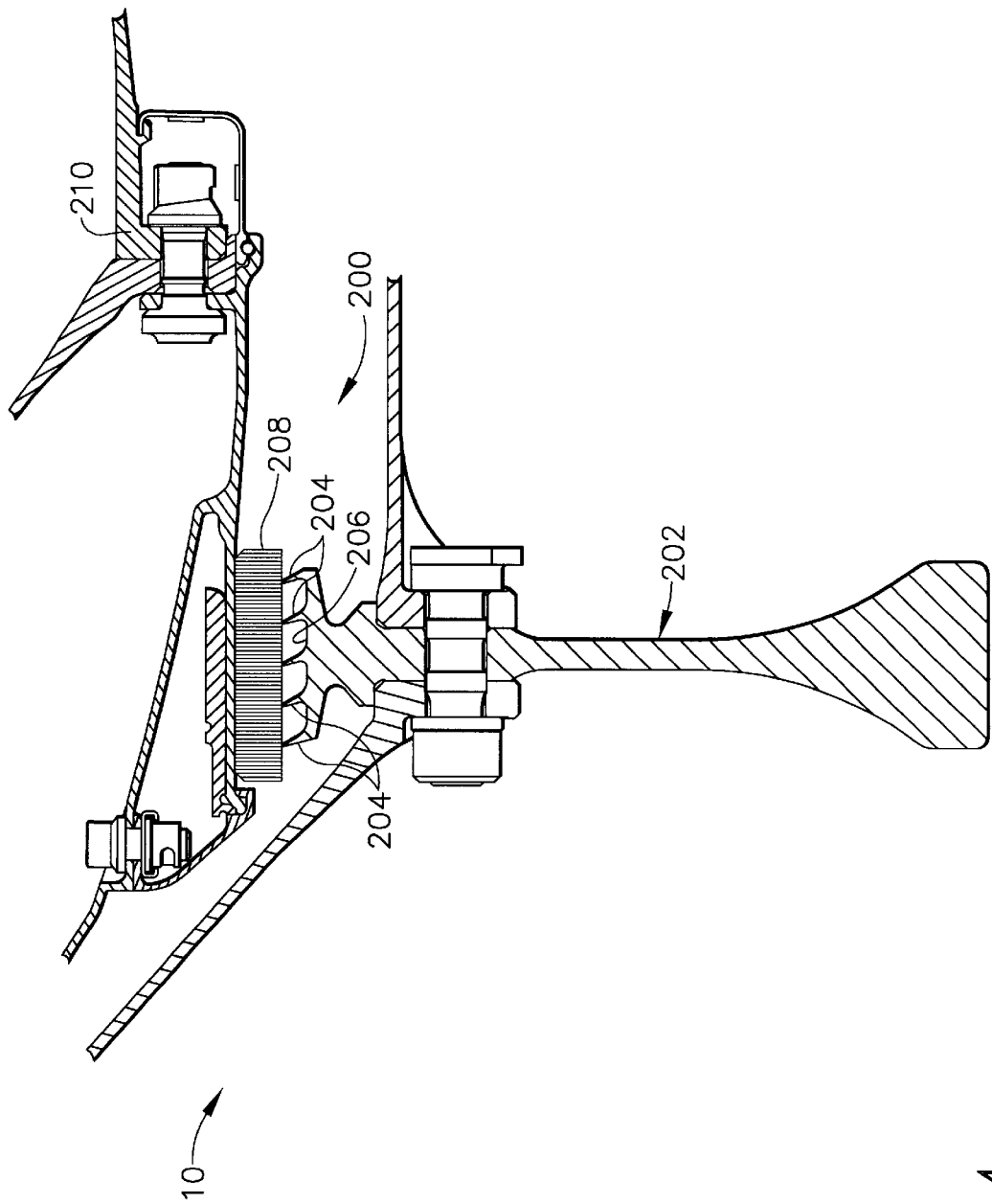
FIG. 4 is a partial schematic view of a labyrinth seal that may be used with the gas turbine engine shown in FIG. 1.

FIG. 4 is a partial schematic view of a portion of gas turbine engine 10 including a labyrinth seal 200 that may be used with gas turbine engine 10. Labyrinth seal 200 is suitably mounted to a first rotatable annular member 202 including a plurality of seal teeth 204 extending radially from an outer peripheral surface 206 of rotatable annular member 202 to define an outer circumference of seal teeth 204.

A honeycomb seal 208 is suitably mounted to a second non-rotatable member 210 and extends radially inward to define an inner circumference of honeycomb seal 208. Honeycomb seal 208 extends circumferentially around rotating member 202 and is fabricated substantially similarly with honeycomb seal 102 (shown in FIG. 2) from a material 130 (shown in FIG. 3). Alternatively, honeycomb seal 208 may be a labyrinth seal (not shown) disposed in a cavity (not shown) between seal teeth 204 located on a first rotatable annular member 202 and a second rotatable member (not shown) that has a different rotation speed than that of first rotatable member 202.

During initial engine operation, the outer circumference of seal teeth 204 rotate within a small tolerance of inner circumference of honeycomb seal 208 thereby effecting a sealing between axially disposed portions of engine 10. As an operating speed of engine 10 is increased, seal teeth 204 may expand radially outward and contact or rub honeycomb seal 208 and cut grooves (not shown) into honeycomb seal 208 to define an operating clearance (not shown) between seal teeth 204 and honeycomb seal 208. More specifically, during operation, seal teeth 204 rotate via rotatable member 202. After turbine 10 operates and reaches a sufficient operating temperature, seal teeth 204 extend into honeycomb seal 208 and restrict air from flowing between seal teeth 204 and honeycomb seal 208.

The above-described gas turbine engine is cost-effective and highly reliable. The stator assembly includes a honeycomb seal that is fabricated from a material that has a melting temperature less than approximately 2000° F. During engine operations, the seal teeth contact the honeycomb seal and generate heat to increase in temperature to a temperature that is not greater than the melting temperature of the honeycomb seal. As the seal teeth cut grooves into the honeycomb seal, the honeycomb seal seals against the seal teeth to prevent air from flowing between the seal and seal teeth. The melting temperature of the honeycomb seal material limits an operating temperature of the seal teeth during the rub. As a result of the honeycomb seals, the seal teeth operate at reduced temperatures in comparison to known seal teeth and are subjected to less thermal stresses and wear. More specifically, because heat damage to the seal teeth is reduced seal teeth durability is improved. Furthermore, property degradation to seal teeth and cracking due to thermal stresses are reduced. Accordingly, because the potential temperature increase during a rub of the seal teeth is reduced, the severity of any thermal gradients generated is reduced and operating clearances between the seal teeth and the honeycomb seal are improved.

While the invention has been described in terms of various specific embodiments, those skilled in the art will recognize that the invention can be practiced with modification within the spirit and scope of the claims.

What is claimed is:

1. A method for assembling a gas turbine engine, said method comprising the steps of:

fabricating a honeycomb seal from a material having a melting temperature less than approximately 2000° F. and securing the seal within the gas turbine engine.

2. A method in accordance with claim 1 wherein said step of fabricating a honeycomb seal further comprises the step of fabricating a honeycomb seal from a material having a melting temperature greater than approximately 1600° F.

3. A method in accordance with claim 1 wherein the gas turbine engine includes a plurality of rotor seal teeth, said step of fabricating a honeycomb seal further comprises the step of fabricating a honeycomb seal from a material having a reduced propensity to crack initiation of the rotor seal teeth.

4. A method in accordance with claim 1 wherein said step of fabricating a honeycomb seal further comprises the step of fabricating a honeycomb seal from a material having a melting temperature approximately equal 1050° F.

5. A honeycomb seal for a gas turbine engine, said seal comprising a material having a melting temperature less than approximately 2000° F., the gas turbine engine including a plurality of seal teeth, said honeycomb seal configured to reduce an operating temperature of the seal teeth as the seal teeth rub said honeycomb seal.

6. A honeycomb seal in accordance with claim 5 wherein the gas turbine engine includes a plurality of seal teeth, said honeycomb seal configured to reduce wear of the seal teeth as the seal teeth rub said honeycomb seal.

7. A honeycomb seal in accordance with claim 5 wherein the gas turbine engine includes a plurality of rotor seal teeth, said material configured to facilitate reducing a propensity of crack initiation within the gas turbine engine rotor seal teeth.

8. A honeycomb seal in accordance with claim 7 wherein said material further configured to facilitate reducing fatigue degradation of rotor seal teeth.

9. A honeycomb seal in accordance with claim 5 wherein said material has a melting temperature greater than approximately 1600° F.

10. A honeybcomb seal in accordance with claim 5 wherein the gas turbine engine includes a plurality of seal teeth, said honeycomb seal configured to reduce an operating clearance between said honeycomb seal and the seal teeth.

11. A gas turbine engine comprising a rotor assembly and a stator assembly comprising a honeycomb seal fabricated from a material having a melting temperature less than approximately 2000° F., said rotor assembly comprising a plurality of seal teeth, said honeycomb seal condfigured to reduce an operating temperature of each of said rotor seal teeth as said seal teeth rub said honeybomb seal.

12. A gas turbine engine in accordance with claim 11 wherein said honeycomb seal configured to reduce an operating clearance between said seal teeth and said honeycomb seal.

13. A gas turbine engine in accordance with claim 11 wherein said honeycomb seal configured to reduce wear of said seal teeth as said seal teeth rub said honeycomb.

14. A gas turbine engine in accordance with claim 11 wherein said material has a melting temperature approximately equal 1930° F.

15. A gas turbine engine in accordance with claim 11 wherein said material has a melting temperature greater than approximately 1600° F.

16. A gas turbine engine in accordance with claim 11 wherein said material has a melting temperature approximately equal 1050° F.

17. A gas turbine engine in accordance with claim 11 wherein said rotor assembly comprises a plurality of rotor seal teeth, said material configured to reduce crack initiation of said rotor seal teeth.

18. A gas turbine engine in accordance with claim 17 wherein said material further configured to reduce fatigue degradation of said rotor seal teeth.

* * * * *

UNITED STATES PATENT AND TRADEMARK OFFICE
CERTIFICATE OF CORRECTION

PATENT NO. : 6,652,226 B2
DATED : November 25, 2003
INVENTOR(S) : Albrecht, Jr. et al.

It is certified that error appears in the above-identified patent and that said Letters Patent is hereby corrected as shown below:

Column 5,
Line 46, delete "2000º F., the gas" and insert therefor -- 2000º F, the gas --.

Column 6,
Line 22, delete "2000º F., said rotor" and insert therefor -- 2000º F, said rotor --.

Signed and Sealed this

Twenty-ninth Day of June, 2004

JON W. DUDAS
*Acting Director of the United States Patent and Trademark Office*